United States Patent
Gaudiau et al.

(10) Patent No.: US 11,067,426 B2
(45) Date of Patent: Jul. 20, 2021

(54) LIQUID TANK WITH CAPACITIVE LEVEL SENSOR

(71) Applicant: TRISTONE FLOWTECH SOLUTIONS (TFS), Carquefou (FR)

(72) Inventors: Ghislain Gaudiau, Ancenis (FR); Louis-Philippe Le Poul, Riaillé (FR); Luc N'Kaoua, Nantes (FR); Xavier Hermange, Treffieux (FR)

(73) Assignee: TRISTONE FLOWTECH SOLUTIONS (TFS), Carquefou (FR)

( * ) Notice: Subject to any disclaimer, the term of this patent is extended or adjusted under 35 U.S.C. 154(b) by 99 days.

(21) Appl. No.: 16/619,335

(22) PCT Filed: Jun. 7, 2018

(86) PCT No.: PCT/FR2018/051330
§ 371 (c)(1),
(2) Date: Dec. 4, 2019

(87) PCT Pub. No.: WO2018/234653
PCT Pub. Date: Dec. 27, 2018

(65) Prior Publication Data
US 2020/0191638 A1 Jun. 18, 2020

(30) Foreign Application Priority Data
Jun. 20, 2017 (FR) .................................. 17 55612

(51) Int. Cl.
G01F 23/26 (2006.01)

(52) U.S. Cl.
CPC ................... G01F 23/268 (2013.01)

(58) Field of Classification Search
CPC .......................... G01F 23/266; G01F 23/268
See application file for complete search history.

(56) References Cited

U.S. PATENT DOCUMENTS 5,315,872 A * 5/1994 Moser ................... G01F 23/268
361/284
2003/0016957 A1 1/2003 Anthony et al.
(Continued)

FOREIGN PATENT DOCUMENTS

| FR | 3 005 942 | 11/2014 |
| GB | 2 210 463 | 6/1989 |
| WO | 99/10714 | 3/1999 |

OTHER PUBLICATIONS

International Search Report dated Sep. 25, 2018.
International Search Report dated Apr. 18, 2018.

*Primary Examiner* — Francis C Gray
(74) *Attorney, Agent, or Firm* — Ipsilon USA, LLP

(57) ABSTRACT

A tank (1) of electrically conductive liquid (12) comprising an enclosure (2) for storage of the liquid (12) delimited by at least one wall (13), a capacitive sensor (5) for measuring the liquid level inside said enclosure (2), and a device (6) for processing the output signal of the sensor (5) outside of the enclosure (2) comprising, in order to form a capacitor, a dielectric (11) and a first frame (10) electrically connectable to a source (18) for supplying power and to the processing device. The first frame (10) is arranged outside the enclosure (2), the dielectric (11) can be at least partially interposed between said first frame (10) and the electrically conductive liquid (12) and the dielectric (11) is formed by at least one part (131) of the wall (13) delimiting the enclosure (2) suitable for coming into contact with the electrically conductive liquid (12) contained inside the enclosure (2).

10 Claims, 3 Drawing Sheets

(56) References Cited

U.S. PATENT DOCUMENTS

| | | | |
|---|---|---|---|
| 2004/0070408 A1 | 4/2004 | Florin et al. | |
| 2006/0267785 A1 | 11/2006 | Viscosi et al. | |
| 2006/0283244 A1 | 12/2006 | Schonlau et al. | |
| 2012/0240675 A1* | 9/2012 | Farmanyan | G01F 23/268 73/304 C |
| 2014/0202559 A1* | 7/2014 | Feltgen | G05D 9/00 137/395 |
| 2014/0305202 A1 | 10/2014 | Periyathamby et al. | |
| 2015/0090735 A1* | 4/2015 | Smith | D06F 39/022 222/83 |
| 2018/0003541 A1* | 1/2018 | Suzuki | G01F 23/74 |

* cited by examiner

LIQUID TANK WITH CAPACITIVE LEVEL SENSOR

RELATED APPLICATION

This application is a National Phase of PCT/FR2018/051330 filed on Jun. 7, 2018, which claims the benefit of priority from French Patent Application No. 17 55612 filed on Jun. 20, 2017, the entirety of which are incorporated by reference.

FIELD OF THE INVENTION

The invention relates to a tank for electrically conductive liquid, particularly for engine cooling circuit liquid.

More particularly, it relates to a tank for electrically conductive liquid, particularly for engine cooling circuit liquid, said tank comprising an enclosure for storing the liquid, which enclosure is supplied with at least one liquid inlet and one liquid outlet, a capacitive sensor for measuring the liquid level inside said enclosure, that can emit an output signal as a function of the liquid level inside said enclosure, and a device for processing the output signal from the sensor arranged outside said enclosure, said enclosure being defined at least by means of a wall, called wall for defining the enclosure, and said capacitive sensor for measuring the liquid level inside said enclosure comprising, in order to form a capacitor, a dielectric and a first plate, the second plate being able to be formed by the electrically conductive liquid that can be contained inside the enclosure, the first plate being arranged outside the enclosure and able to be electrically connected to a power supply source and to the processing device, and the dielectric, which can at least be partially inserted between said first plate and the electrically conductive liquid that can be contained inside the enclosure, being produced as a single piece with at least one part of the wall for defining the enclosure that can come into contact with the electrically conductive liquid contained inside the enclosure in order to form a unitary assembly.

PRIOR ART

The liquid tanks of the aforementioned type incorporating a capacitive sensor are known, as the American application US 2004/0070408 illustrates. This simplification of the sensor leads to the sensor being exposed to shock. Furthermore, since the wall of the tank is planar, it is sometimes difficult to fix the remaining elements of the sensor to the wall of the enclosure.

AIMS AND SUMMARY

The aim of the invention is to propose a liquid tank, for which the capacitive sensor design makes it possible to omit the installation of elements inside the enclosure of the tank for measuring the level, without affecting the mounting simplicity of the sensor.

Another aim of the invention is to propose a liquid tank, for which the capacitive sensor design makes it possible to omit any contact of the liquid contained inside the tank with the elements of the sensor that are sensitive to such contact while simplifying the design of the assembly.

To this end, the object of the invention is a tank for electrically conductive liquid, particularly for engine cooling circuit liquid, said tank comprising an enclosure for storing the liquid, which enclosure is supplied with at least one liquid inlet and one liquid outlet, a capacitive sensor for measuring the liquid level inside said enclosure, that can emit an output signal as a function of the liquid level inside said enclosure, and a device for processing the output signal from the sensor arranged outside said enclosure, said enclosure being defined at least by means of a wall, called wall for defining the enclosure, and said capacitive sensor for measuring the liquid level inside said enclosure comprising, in order to form a capacitor, a dielectric and a first plate, the second plate being able to be formed by the electrically conductive liquid that can be contained inside the enclosure, the first plate being arranged outside the enclosure and able to be electrically connected to a power supply source and to the processing device, and the dielectric, which can at least be partially inserted between said first plate and the electrically conductive liquid that can be contained inside the enclosure, being produced as a single piece with at least one part of the wall for defining the enclosure that can come into contact with the electrically conductive liquid contained inside the enclosure in order to form a unitary assembly, characterized in that the part of the wall for defining the enclosure making up the dielectric forms a projection in the direction of the interior of the enclosure, in that said projection defines a cavity open in the direction of the exterior of the enclosure, in that at least the first plate is arranged at least partially inside said cavity and in that the first plate is a hollow piece.

Thanks to the fact that the dielectric and a part of the wall for defining the enclosure are produced as a single piece and form a unitary assembly, this results in construction simplicity.

Thanks to the fact that the first plate is arranged outside the enclosure and that the electrically conductive liquid contained in the enclosure functions as the second plate of the capacitor, no conductive element of the sensor, sensitive to contact with a liquid, can come into contact with the content of the enclosure.

Thanks to the fact that the part of the wall for defining the enclosure making up the dielectric forms a projection defining a cavity for housing the first plate and that the first plate is a hollow piece, this results in simplicity for assembling the first plate without requiring fixing means, wherein this first plate can furthermore form a housing for receiving other elements without affecting the simplicity of the assembly.

According to an embodiment of the invention, the first plate which is a hollow piece at least partially houses the processing device in the state where the processing device is connected to said first plate.

According to an embodiment of the invention, said projection has the shape of a blind tubular body open in the direction of the exterior of the enclosure.

According to an embodiment of the invention, the first plate is an electrically conductive piece force-fitted or overmoulded in said cavity.

According to an embodiment of the invention, said cavity is closed at least partially by a connector.

According to an embodiment of the invention, the first plate is electrically connectable to the processing device by an electric link comprising a tongue cut from the material making up the first plate, or rigidly connected to the processing device.

According to an embodiment of the invention, the processing device can be connected to a computer and comprises filtering, rectifying and amplifying means for the output signal from the capacitive sensor.

According to an embodiment of the invention, the projection extends from the bottom area of the enclosure in the direction of the interior of the enclosure. This results in the possibility of using the level sensor for a wide range.

According to an embodiment of the invention, the enclosure is formed from two shells, called upper and lower, and the projection is arranged at the lower shell and extends vertically like a chimney closed at the top thereof from the part forming the bottom of the enclosure of the lower shell in the direction of the upper shell.

According to an embodiment of the invention, the first plate has the shape of a longitudinally split sleeve.

BRIEF DESCRIPTION OF THE FIGURES

The invention will be clearly understood upon reading the following description of exemplary embodiments, with reference to the appended drawings wherein.

DETAILED DESCRIPTION

As stated above, the liquid tank 1 which forms the object of the invention is intended to contain an electrically conductive liquid 12.

Figure 1:
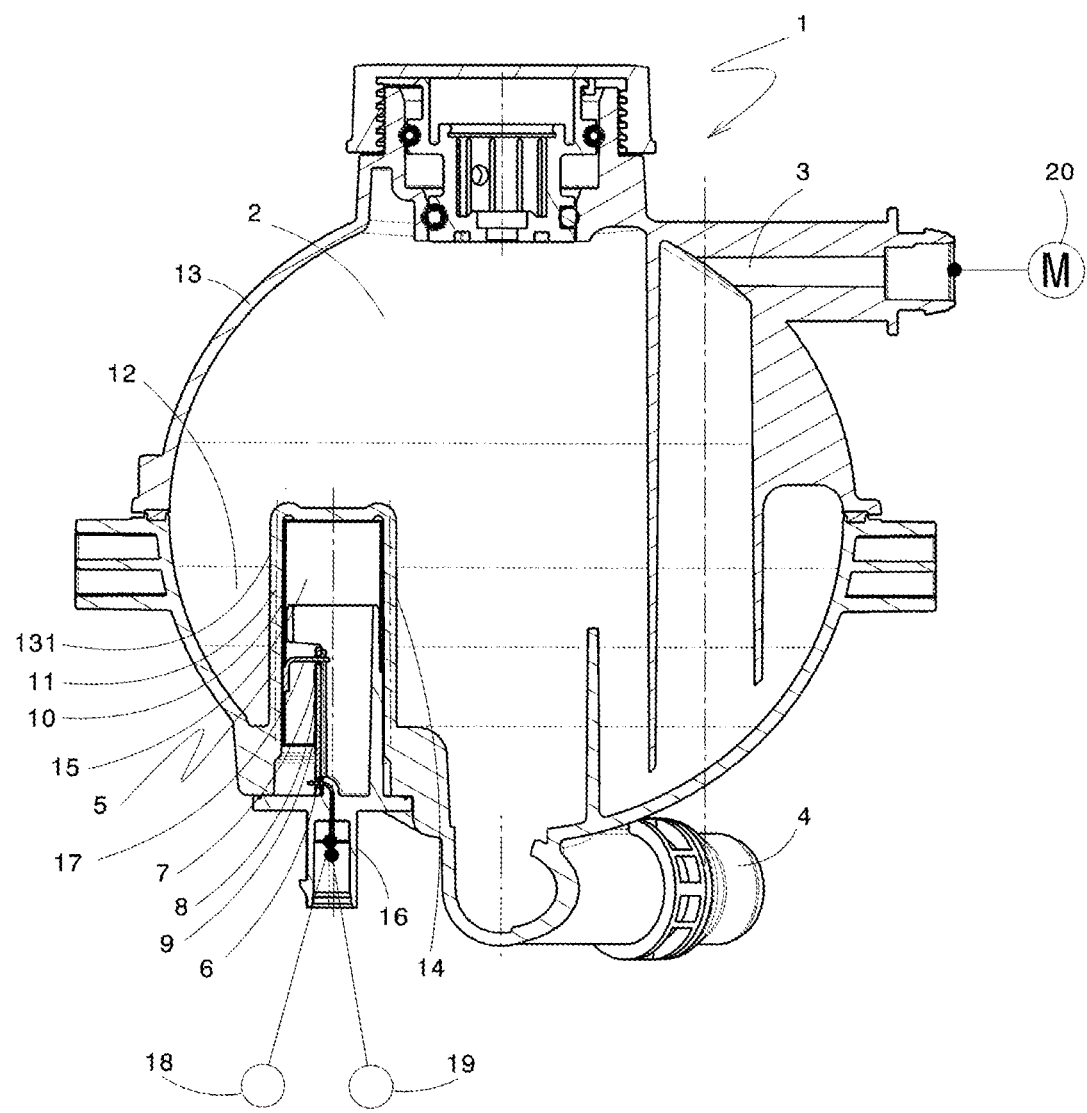
FIG. 1 represents a sectional view of a tank in accordance with the invention.
Figure 2:
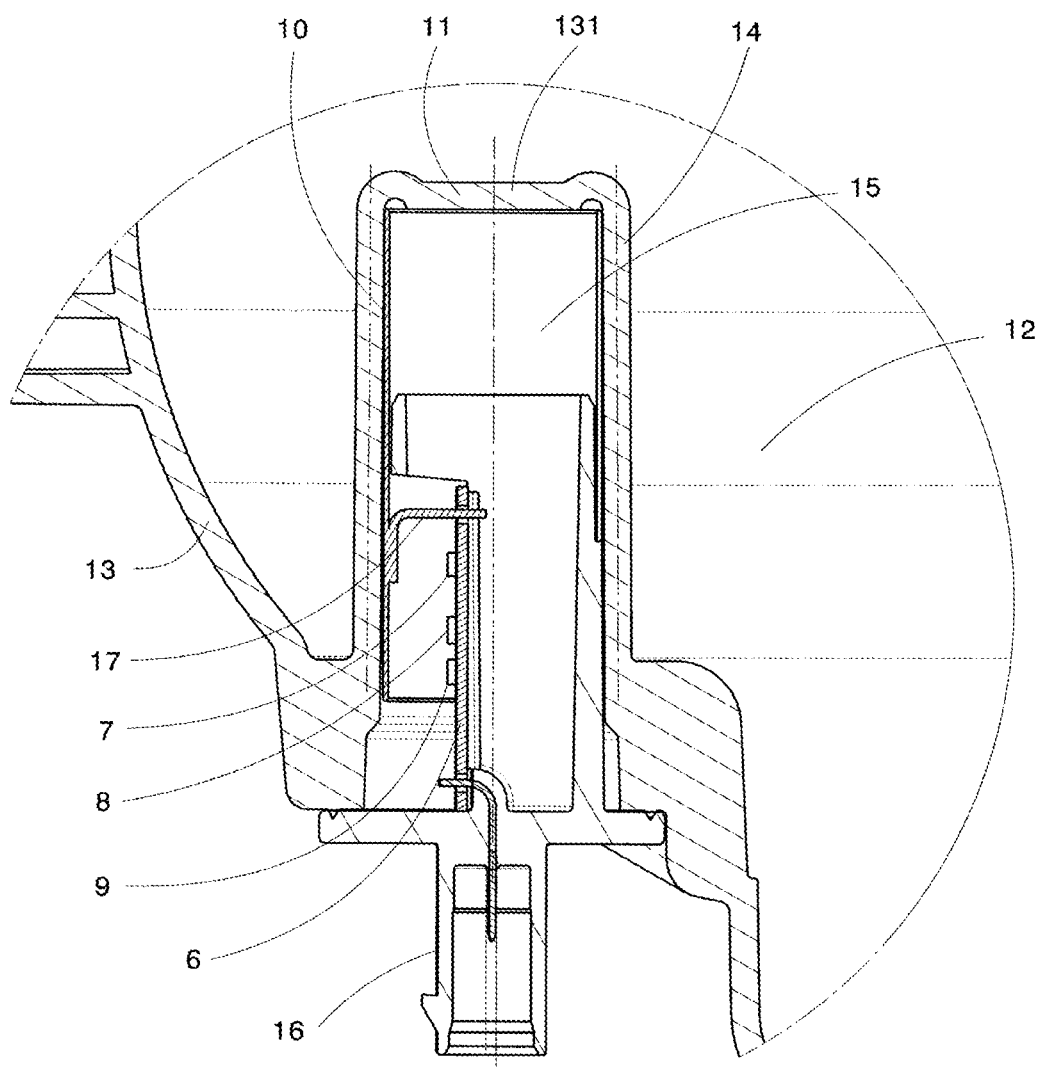
FIG. 2 represents a partial view of a detail of FIG. 1, which view is taken at the capacitive sensor.
Figure 3:
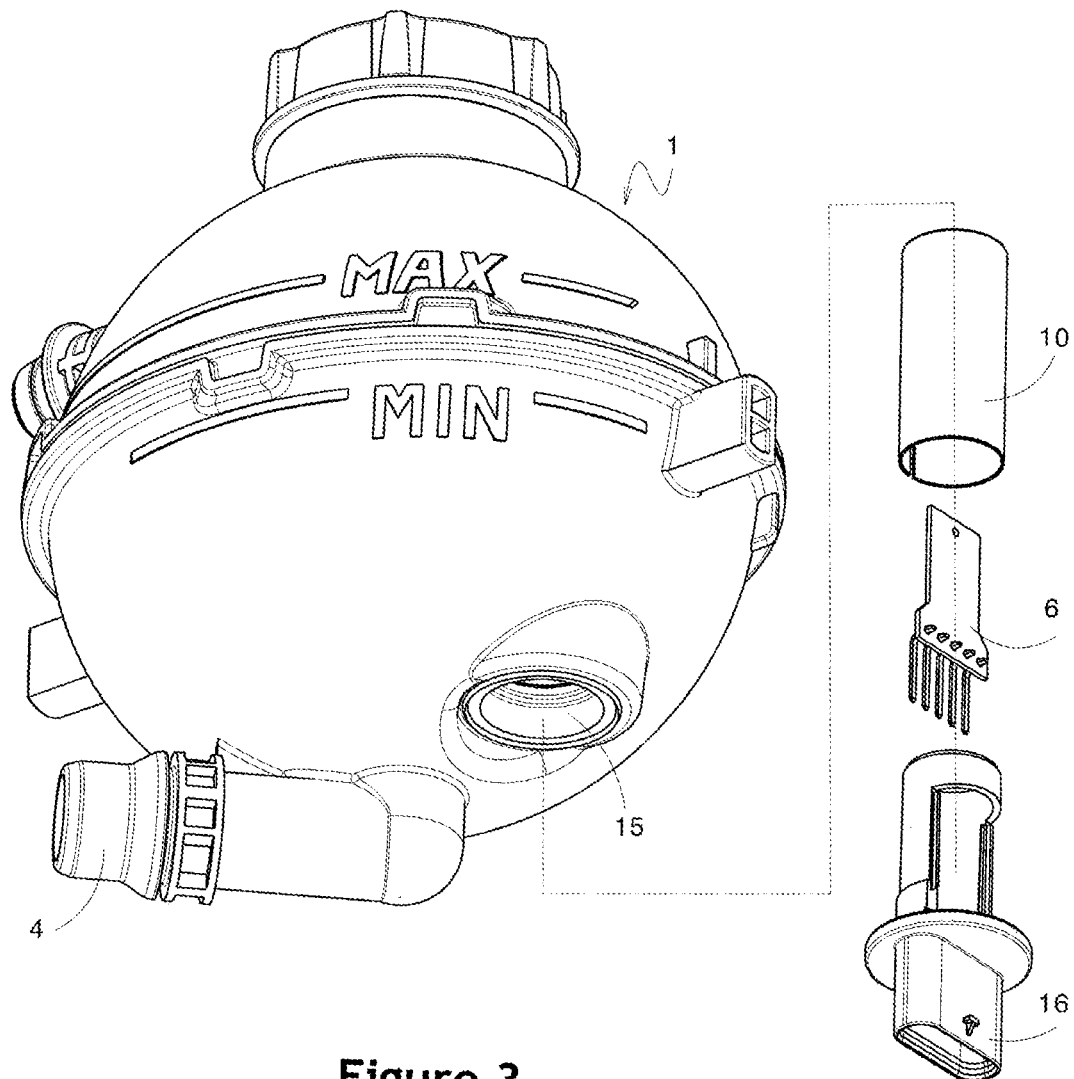
FIG. 3 represents a perspective view of the enclosure of the tank, associated with an exploded position view of the elements, such as the first plate and the processing device, which are intended to be housed inside the cavity provided by the part of the wall for defining the enclosure making up the dielectric projecting in the direction of the interior of the enclosure.

In the represented example, the liquid tank 1 is intended to contain a coolant, such as glycol water, this liquid allowing the cooling of an engine 20, arranged on the coolant circuit incorporating such a tank 1. This engine 20, also represented by the letter M in FIG. 1, can be provided on a vehicle.

This tank 1 comprises an enclosure 2 for storing electrically conductive liquid 12, which enclosure is supplied with at least one fluid inlet 3 and one fluid outlet 4. In the represented example, the fluid inlet and the fluid outlet are separate. However, the invention also relates to the tanks comprising an enclosure in which the liquid inlet and the liquid outlet are shared.

This enclosure 2 is defined by means of a wall 13 for defining the enclosure 2. In the represented example, the enclosure has a general spherical shape, but it can have a large number of shapes.

This molded enclosure 2 can be formed as a single molded piece, or as an assembly of several molded pieces, as in the represented example. In this example, the enclosure is formed by assembling two molded pieces each having a shell shape. This enclosure 2 is produced from synthetic material. The wall for defining the enclosure 2 is thus not electrically conductive.

The tank 1 further comprises a capacitive sensor 5 for measuring the liquid level inside said enclosure 2. This capacitive sensor 5 can emit an output signal as a function of the liquid level inside the enclosure 2.

The device 6 for processing the output signal from the sensor 5 is arranged outside the enclosure 2.

The advantage of a capacitive sensor 5 is that it makes it possible to detect either a single level threshold, or several level thresholds. Therefore, it is possible to detect substantial circuit leaks and, in the case of a circuit for cooling an engine of a vehicle, immediately inform the driver when there is a rapid leak that can jeopardize the operation of the engine.

The capacitive sensor 5 for measuring the liquid level inside the enclosure comprises, in order to form a capacitor, a dielectric 11 and a first plate 10 that can be electrically connected to a power supply source 18, and to the processing device 6.

This first plate 10 is arranged outside the enclosure 2. The dielectric 11 can be at least partially inserted between the first plate 10 and the electrically conductive liquid 12 contained inside the enclosure 2. This electrically conductive liquid 12 can form a second plate of the capacitor.

The dielectric 11 is formed by a least one part 131 of the wall 13 for defining the enclosure 2 that can come into contact with the electrically conductive liquid 12 contained inside the enclosure 2. This dielectric 11 is thus produced as a single piece with the part 131 of the wall 13 for defining the enclosure 2 that can come into contact with the electrically conductive liquid 12 contained inside the enclosure 2 in order to form a unitary, in particular monolithic, assembly.

The capacitance variation results from the change in the surface area of the plates of the capacitor and, consequently, in the level or height of liquid inside the tank, due to the design.

The part 131 of the wall 13 for defining the enclosure 2 making up the dielectric 11 forms a projection 14 in the direction of the interior of the enclosure 2.

This projection 14, which has the shape of a blind tubular body open in the direction of the exterior of the enclosure 2 like a glove finger, is therefore a hollow projection.

In the represented example, the tubular body is a cylindrical body with a circular section. Thus, this projection 14 defines a cylindrical cavity 15 open in the direction of the exterior of the enclosure 2.

The protuberance thus formed by this projection 14 in the direction of the interior of the enclosure 2 is, in the represented examples, provided at the part forming the bottom of the tank of the enclosure. In particular, in the represented example, where the enclosure 2 is formed from two hemispherical so-called upper and lower shells assembled by a joint or assembly plane with the liquid inlet 3 of the enclosure 2 provided at the upper shell and the liquid outlet 4 provided at the lower shell, this projection is arranged at the lower shell and extends vertically like a chimney closed at the top thereof from the part forming the bottom of the enclosure of the lower shell in the direction of the upper shell.

The cavity 15 defined by the projection 14 allows the first plate 10 and possibly at least part of the processing device 6 to be housed.

In the represented example, the first plate is in the form of an electrically conductive hollow piece, in this case a longitudinally split metal sleeve, this sleeve being forcibly inserted into the cavity 15 in order to come into bearing contact with the wall for defining the cavity 15 forming the part 131 of the wall 13 for defining the enclosure 2 making up the dielectric.

The processing device 6 is housed inside the first plate 10. This processing device 6 is, in the represented example, in the form of an electronic board bearing filtering means 7, rectifying means 8 and amplifying means 9 for the output signal from the capacitive sensor 5. Thus, the filtering means 7 can comprise a filter, preferably a low-pass filter, the rectifying means 8 can comprise rectifying diodes and the amplifying means 9 can comprise at least one operational amplifier.

This processing device 6 is connected by wired link to a computer, such as the on-board computer of the vehicle in the case of a tank provided on a vehicle.

To facilitate such a connection, a tubular connector 16 carrying the electronic board of the processing device 6 is also partially fitted into the cavity 15.

To allow the establishment of an electrical link between the first plate and the processing device 6, a tongue is cut from the material making up the first plate 10 and is folded back until coming into contact with the processing device 6, this tongue being electrically connected to the processing device 6.

The processing device 6 also forms a relay between a power supply source, such as a battery of the vehicle and the first plate in the form of direct voltage.

In these embodiments, it is therefore sufficient, once the processing device 6 has been inserted into the connector 16 and this assembly nested into the first plate 10, to force-fit the first plate 10 into the cavity 15 of the projection 14. The capacitive sensor elements sensitive to the contact with a liquid are thus mounted entirely from outside the enclosure, such that no piece can come into contact with the liquid that can be contained inside the enclosure 2.

In an alternative, the first plate 10 would have been able to be overmoulded with the projection 14, with the rest of the mounting remaining identical.

The presence of such a capacitive sensor makes it possible to measure the liquid level inside the tank. Depending on the results of the processing of the output signal from the sensor, information can be sent via a display device coupled to the computer to the driver of the vehicle, when the tank is provided on such a vehicle.

The invention claimed is:

1. A tank for electrically conductive liquid, particularly for engine cooling circuit liquid, said tank comprising:
   an enclosure for storing the liquid, which enclosure is supplied with at least one liquid inlet and one liquid outlet, a capacitive sensor for measuring the liquid level inside said enclosure, that can emit an output signal as a function of the liquid level inside said enclosure, and
   a device for processing the output signal from the sensor arranged outside said enclosure, said enclosure being defined at least by means of a wall, called wall for defining the enclosure, and said capacitive sensor for measuring the liquid level inside said enclosure comprising, in order to form a capacitor, a dielectric and a first plate, the second plate being able to be formed by the electrically conductive liquid that can be contained inside the enclosure, the first plate being arranged outside the enclosure and able to be electrically connected to a power supply source and to the processing device, and the dielectric, which can at least be partially inserted between said first plate and the electrically conductive liquid that can be contained inside the enclosure, being produced as a single piece with at least one part of the wall for defining the enclosure that can come into contact with the electrically conductive liquid contained inside the enclosure in order to form a unitary assembly,
   wherein the part of the wall for defining the enclosure making up the dielectric forms a projection in the direction of the interior of the enclosure, in that said projection defines a cavity open in the direction of the exterior of the enclosure, in that at least the first plate is arranged at least partially inside said cavity and in that the first plate is a hollow piece.

2. The tank as claimed in claim 1, wherein the first plate which is a hollow piece at least partially houses the processing device in the state where the processing device is connected to said first plate.

3. The tank as claimed in claim 1, wherein said projection has the shape of a blind tubular body open in the direction of the exterior of the enclosure.

4. The tank as claimed in claim 1, wherein the first plate is an electrically conductive piece force-fitted or overmoulded in said cavity.

5. The tank as claimed in claim 1, said cavity is closed at least partially by a connector.

6. The tank as claimed in claim 1, wherein the first plate is electrically connectable to the processing device by an electric link comprising a tongue cut from the material making up the first plate or rigidly connected to the processing device.

7. The tank as claimed in claim 1, wherein the processing device can be connected to a computer and comprises filtering, rectifying and amplifying means for the output signal from the capacitive sensor.

8. The tank as claimed in claim 1, wherein the projection extends from the bottom area of the enclosure in the direction of the interior of the enclosure.

9. The tank as claimed in claim 1, wherein the enclosure is formed from two shells, called upper and lower, and in that the projection is arranged at the lower shell and extends vertically like a chimney closed at the top thereof from the part forming the bottom of the enclosure of the lower shell in the direction of the upper shell.

10. The tank as claimed in claim 1, wherein the first plate has the shape of a longitudinally split sleeve.

* * * * *